Jan. 4, 1927.                    J. LYNCH                    1,612,825
METHOD OF PRODUCING MOLDED OBJECTS OF CONTRASTING COLORS
Filed May 20, 1926
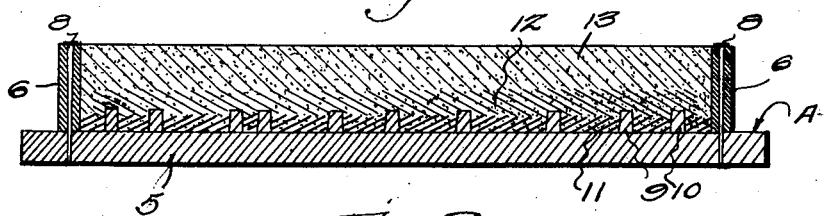
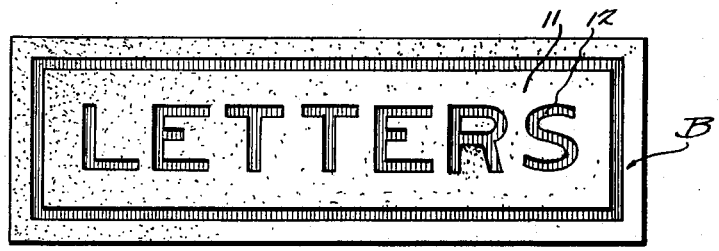
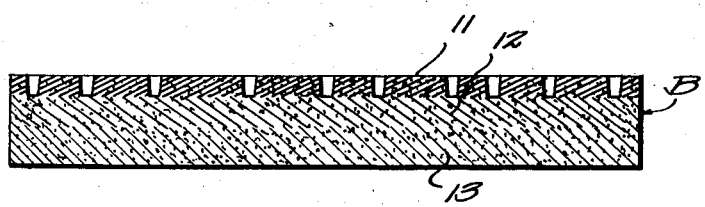
Inventor
JOSEPH LYNCH
By
C. M. Parker
Attorney Patented Jan. 4, 1927.

1,612,825

UNITED STATES PATENT OFFICE.

JOSEPH LYNCH, OF HORSEHEADS, NEW YORK.

METHOD OF PRODUCING MOLDED OBJECTS OF CONTRASTING COLORS.

Application filed May 20, 1926. Serial No. 110,515.

This invention relates to the art or process of making objects or articles composed of different colored plastic compositions or materials and has for its object combining different colored plastic materials in one body in such a manner that the object or article has a face or outer surface of one color, while the recessed or depressed part of the object or article has a contrasting color.

Another object of the invention is to provide an art or process of combining plastic materials or compositions of two or more colors in such a manner that the object or article may be permanently formed, to display upon its face or outer surface contrasting colors.

A further object of the invention is to provide an article having recessed figures or letters formed with a background of a contrasting color from the outer face of the article.

My process is used to produce many and various objects and articles, such as for example, signs, slabs, posts, monuments, and other objects or articles containing letters, figures, inscriptions, designs and other indicia in plastic objects or articles of other designs or character.

To these ends my invention consists in the process of molding into one body, two or more plastic materials or compositions of different color as desired, or as occasion may demand, so as to produce in the finished product, contrasting colored bottoms of the letters, figures, designs, patterns or other depressions from the face or outer surface.

In the accompanying drawing forming a part of this application in which I have shown one embodiment of my invention, Figure 1 is a top plan view of a molding apparatus utilized in my process, Figure 2 is a central longitudinal section through the same showing the mold in use, Figure 3 is a plan view of one article completed in accordance with my process, and Figure 4 is a central longitudinal section through the article.

Referring to the drawings in detail wherein similar reference characters designate corresponding parts throughout the several views, the letter A generally indicates the molding apparatus and B the completed object produced from the molding apparatus in accordance with my method.

The molding apparatus A comprises a bottom or mold board 5, end walls 6 and side walls 7. As shown, the end and side walls 6 and 7 are disposed slightly inwardly of the margin of the bottom or mold board 5 and these end and side walls are secured to the bottom board in any desired way. It is preferred however to connect the end and side walls with the bottom board in such a manner that these walls can be removed after the object has been formed and the plastic materials or compositions have become hardened. As shown, suitable fastening elements 8 extend through the walls into the bottom board, but suitable clamps can be used in lieu thereof if desired.

The mold thus formed is adapted to contain the letters, figures, designs, patterns or other objects, which are fastened in a suitable manner to the bottom board of the mold. In the embodiment shown in the drawings I have secured to the bottom board 5 letters 9, so as to produce suitable indicia on the face of the article being molded. These letters are placed on the mold or bottom board 5 in reverse, as clearly shown in Figure 1 of the drawings. In the form shown I have surrounded the letters 9 by a suitable border strip 10 which is spaced a desired distance from the end and side walls of the mold. If preferred the letters 9 and the border strip 10 can be gradually tapered toward their outer ends so as to enhance the appearance of the letters and border produced on the article or object molded and to facilitate the removal of the object or article from the mold.

In perfecting a product, according to my process, I employ a plastic material of various colors for molding into one body, various articles or objects as desired, in contrasting colors, and the process is carried out as follows:

The bottom 5, ends 6 and sides 7 of the mold A having been assembled, the letters, figures, designs, patterns, or other objects, desired to be reproduced in the finished product are fastened to the bottom 5 in a suitable manner, which in thus instance, as stated, are reversed letters 9 and a border 10. For the face of the finished product or the bottom of the mold, I employ (for example white) plastic material or composition 11, filling the mold in and around the reversed letters 9 and border 10, leaving the reversed letters 9 and border 10 projecting through the plastic material covering the bottom of the mold. I next employ (for example black) plastic material or composition 12 which is placed directly above and on the material 11 used for the bottom of the mold and I completely cover the tops or projecting parts of the reversed letters 9 and border 10. I then complete the filling of the mold by placing upon the last laid plastic material 12 a plastic material 13 of any desired color which forms the base for the object or article being molded.

It will be seen that the various plastic materials used in this process are placed in the mold one upon the other and I prefer to place the materials in place one immediately following the other and thus form one monolithic body. However, a considerable lapse of time can take place between the placing of the different materials in the mold without departing from the spirit of the invention. The mold and process above described, will form a product, with a white face, and the bottoms of the letters and border will be of a contrasting black color, thus making a sign with a white face and black letters.

It is to be understood that I can use any contrasting colors that I may prefer and that I do not desire to limit myself to the use of black and white materials.

Changes in details may be made without departing from the spirit of the invention but what I claim is:

The process of molding a plurality of plastic masses of contrasting colors into one monolithic body for signs, slabs, posts, monumental and other objects and articles containing letters, figures, inscriptions, designs, patterns and other indicia which consists in placing indicia upon a mold board, completely covering and packing a plastic material upon the board around the indicia, leaving the indicia projecting through the material, next placing on top of the plastic material and on top of the indicia and extending thereabove a second plastic composition of a contrasting color from the first composition, and next removing the mold from the materials.

In testimony whereof I affix my signature.

JOSEPH LYNCH.